(No Model.) 2 Sheets—Sheet 1.
C. L. CUNNINGHAM.
BICYCLE GEAR ATTACHMENT.
No. 559,934. Patented May 12, 1896.
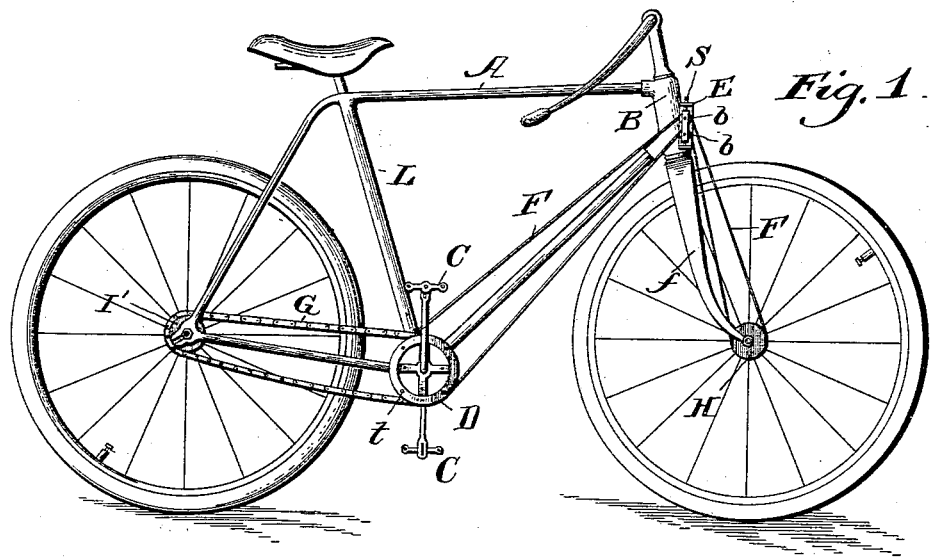
Fig. 1.
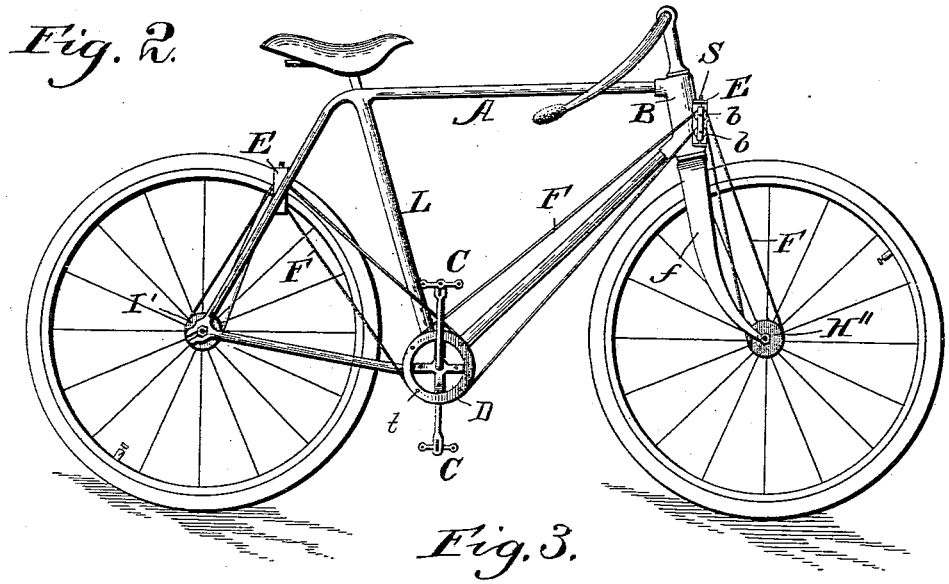
Fig. 2.
Fig. 3.
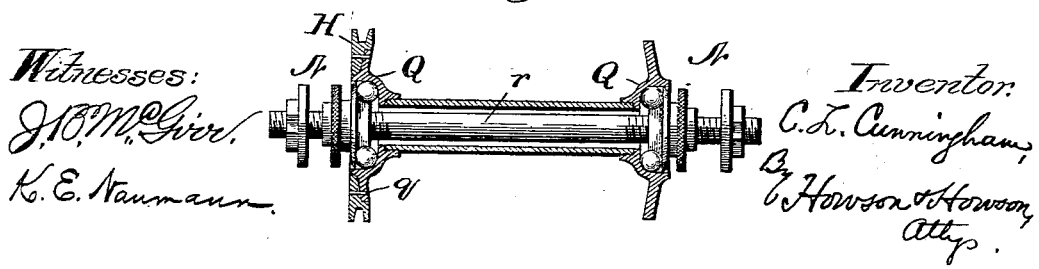
Witnesses:
J. B. McGirr
K. E. Naumann
Inventor:
C. L. Cunningham,
By Howson & Howson,
Attys.

(No Model.) 2 Sheets—Sheet 2.
C. L. CUNNINGHAM.
BICYCLE GEAR ATTACHMENT.
No. 559,934. Patented May 12, 1896.
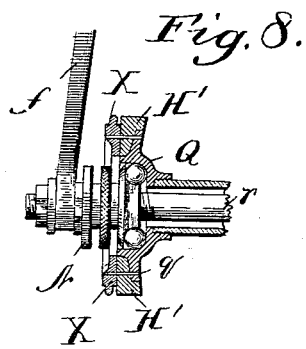
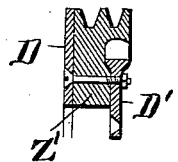
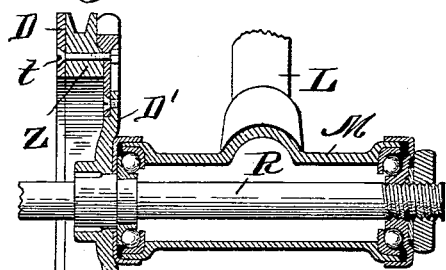
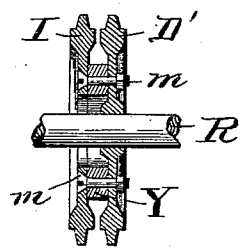
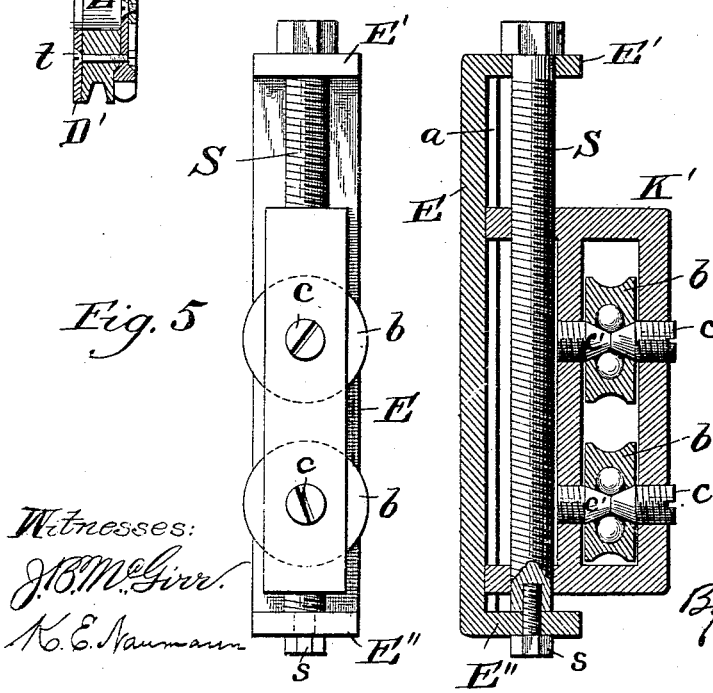
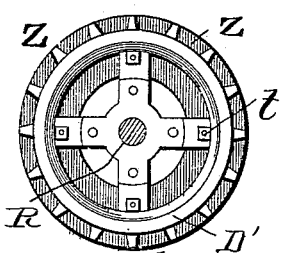
Witnesses:
J. B. McGirr.
K. E. Naumann.
Inventor:
C. L. Cunningham,
By Howson & Howson
Attys.

UNITED STATES PATENT OFFICE.

CALEB LORING CUNNINGHAM, OF MILTON, MASSACHUSETTS.

BICYCLE-GEAR ATTACHMENT.

SPECIFICATION forming part of Letters Patent No. 559,934, dated May 12, 1896.

Application filed June 27, 1895. Serial No. 554,263. (No model.)

*To all whom it may concern:*

Be it known that I, CALEB LORING CUNNINGHAM, a citizen of the United States, residing at Milton, in the county of Norfolk and State of Massachusetts, have invented certain new and useful Improvements in Bicycle-Gear Attachments, of which the following is a specification.

My invention relates to bicycle-gear attachments, and has for its essential object the provision of a simple attachment adapted to be readily applied to any standard bicycle, without alteration of the existing gear, for the purpose of securing a better control of the machine in ascending and descending inclines than has heretofore been obtained with the usual gearing now employed, and, incidentally, my object is to reduce the strain upon a given part of the machine, particularly in starting and stopping, by distributing such strain over a greater portion of the frame than has heretofore been done.

With these special objects in view, and with the general object of improving the driving-gear of bicycles, to the end that they may be ridden with greater comfort and ease, my invention consists in the novel attachment and construction hereinafter described, and more particularly pointed out in the claims, with reference to the accompanying drawings.

In the drawings, Figure 1 is a side elevation of a standard bicycle, showing one form of my invention applied thereto. Fig. 2 is a similar view showing a modification. Fig. 3 is a sectional view of the hub of the front wheel with the axle in elevation, showing a detail of my invention. Fig. 4 is a sectional view of the crank-shaft box and driving sprocket-wheel, showing the application of my supplemental gear or pulley thereto. Fig. 5 is an enlarged side view of my supplemental bearing-frame carrying the counter gears or pulleys. Fig. 6 is a vertical section thereof with the adjusting supporting screw-bolt in elevation. Fig. 7 is a sectional view of a modified form of the supplemental crank-pulley or sprocket attachment. Fig. 8 is a sectional detail view of a modification of the supplemental crank-pulley, Fig. 3. Fig. 9 is a sectional detail of a modification of the construction shown in Fig. 4. Fig. 10 is a face view of construction shown in Fig. 4.

Referring now to the drawings, particularly Figs. 1, 3, 4, 5, and 6, A indicates the frame of an ordinary standard machine provided with the usual steering-head B, supported upon the front axle by the forks $f$.

C are cranks projecting from the usual crank-shaft R, journaled upon ball-bearings in the crank-box M, attached to the seat-support L. Upon the crank-shaft is the ordinary sprocket-gear D', transmitting motion by the sprocket-chain G to the sprocket I' on the hub of the rear wheel of the machine. These parts are all constructed as usual and need not further be particularly described.

In order to provide means for readily controlling the wheel in ascending and descending inclines, I find, after considerable experiment, that this object may be effected by the addition of supplemental gearing for driving the front wheel, operated from the usual or ordinary crank-shaft, and I accomplish this, in one way, by the construction which I will now describe.

To the face of the gear D', I preferably secure a wooden pulley Z by means of a steel face or clamp plate D, through which pulley and plate are passed suitable securing-bolts $t$, Fig. 4. If it is desired to increase the diameter of the driving-gear, I may entirely cover the gear D' by a double-grooved wooden rim or pulley Z', secured to said gear D' in the manner just described, as shown in Fig. 9.

To the hub Q of the front wheel of the bicycle is secured, by suitable bolts $q$, a wooden pulley H. If desired, a small gear X' may be used in place of the pulley, which gear may be secured to the hub of the wheel by bolts passing through the gear and a wooden rim or face-plate H' between the hub and gear, Fig. 8. The introduction of the pulley H or the gear X necessitates the spreading of the forks $f$ about an inch, and to accomplish this I place upon the axle $r$ of the wheel two nuts N, which are to be screwed against the bearing-boxes of the axle between the forks.

Passing from the supplemental pulley Z or Z' to the front-wheel pulley H is an endless belt F. This belt passes over two small counter-pulleys $b$, preferably of case-hardened steel, carried on roller-bearings in an adjustable bearing-box K, supported by a screw-bolt S, preferably of Bessemer steel, on a supplemental bearing-frame E of suitable material, preferably of cast brass, attached to the steering-head B of the bicycle. This frame E, as shown in Figs. 5 and 6 in detail, is attached to the frame of the machine by countersunk screws, and is provided with upper and lower heads E' and E" and with a rib a, forming a way upon which the box or frame K' is adapted to slide vertically, said frame being provided with a groove meshing with the said way. The screw-bolt S is provided with a head at its upper end and passes through the upper head of the frame E and through screw-threaded holes in the frame K', its lower end resting against the lower head E" of the frame E. A small binding-screw s passes through the lower head E" of the frame E and engages the lower end of the screw-bolt for the purpose of locking and unlocking the said screw-bolt. The pulleys b are mounted on roller-bearings, as shown, two conically-headed adjustable screw-plugs c c', preferably of tempered steel, supporting the antifriction-balls. By this construction it will be seen that when it is desired to tighten or loosen the belt F the binding-screw s is eased and the screw-bolt S is turned so as to raise or lower the frame K, thereby raising or lowering the bight of the belt, thus tightening or loosening the belt, as desired.

Instead of employing the construction shown in Fig. 4 for attaching the supplemental pulley or gear, I may use the form shown in Fig. 7, where it is seen that the supplemental gear I is secured to the face of the gear D' by bolts m, passing through the two gears, with an annular spacing rim or collar Y placed between the two for properly spacing the same. If the gears D' are wheels provided with spokes, as is the case with the interchangeable sprocket-gears in common use, the bolts m will pass through the spokes of the wheel. If desired, the spacing rim or collar Y may be fastened by suitable means directly to the shaft R and any size of gears may be bolted on each side thereof in the manner shown, according as a greater or less speed is desired.

Instead of using a single belt with the sprocket-chain G, I may use two belts F and F', as shown in Fig. 2, the latter of which passes over the pulleys b in a supplemental bearing-frame E, attached to the rear portion of the frame A of the bicycle similarly to the belt F, and, if desired, this belt F' may also be used in connection with the belt F and the sprocket-chain G by providing the rear wheel with a pulley similar to the pulley H on the front wheel.

By providing means for driving both the front and rear wheels in the manner above described a better control of the wheel is secured in ascending and descending inclines. The machine, furthermore, has less strain brought on any one portion than formerly, because the work is distributed over many parts, where a few parts formerly stood the entire strain, particularly in a quick start, and this distribution of strain is effected without any practical loss by friction. It may also be noted that the power is distributed over twice the surface by driving the front wheel from the crank as well as the rear wheel, and the increased leverage resulting from the employment of the counter pulleys or gears on the steering-head between the front wheel and crank-shaft practically overcomes what little added friction there may be due to the extra gears or pulleys, while the greater directly-driven surface of the wheels in contact with the ground gives a better control over the machine, inasmuch as the front wheel, by my invention, is driven by direct application of power and is not pushed and caused to turn by its own friction, as is now the case with the usual gearing. On rising ground, therefore, there is a complete and perfect control of the wheel through the crank, and on descending ground or inclines the front wheel is likewise controlled without the use or necessity of brakes, which may be entirely dispensed with by my invention, for this wheel cannot turn freely by its own weight and tend to run away, as in the uncontrolled wheel.

It is also found that the rod extending from the bearing of the crank-shaft to the bearing of the rear wheel in the frame on the chain side of the wheel is prevented from buckling and causing the crank to interfere with the chain, as is frequently the case in the ordinary single driving-wheel. I should further observe that the added weight in the case of a belt and wooden pulleys is practically of no consequence, as it is within one pound and a half, and the simplicity of such construction is such as to render its cost very little, and in comparison to the benefit and comfort derived therefrom it is not to be considered.

While I have used the words "pulleys and gears" and "belt and chain," it is to be understood, of course, that they may be used interchangeably. If it is desired to use a pulley, then it is preferable to make it of light strong wood and use with it the belt, thus adding the least weight to the machine; but when it is desired to use the sprocket-chain the gears can be made of steel, having spokes to reduce the weight to a minimum, and I wish it understood that the terms "pulley and gear" and "chain and driving belt" are to be considered, where used in this specification and claims, as equivalents, respectively, though I prefer to employ the gear and the chain, as they are more durable and present a neater and better appearance and require less adjustment.

I claim as my invention—

1. In a bicycle, the combination with the crank-shaft and driving-gear thereof, and the driving belt or chain transmitting motion to the rear wheel, of a single supplemental driving belt or chain transmitting motion to the front wheel, and counter pulleys or gears attached to the frame of the machine above the wheel and between the said wheel and crank-shaft, over which both runs of the supplemental belt pass, substantially as described.

2. In a bicycle, the combination with the crank-shaft and driving-gear thereon, and the chain or belt for driving the rear wheel, a single belt or chain for driving the front wheel, a supplemental bearing-frame carrying counter pulleys or gears, one above the other and secured to the frame of the machine above the wheel and between the crank-shaft and said wheel, a pulley or gear upon the front wheel, a supplemental pulley attached to the crank-shaft, and a driving belt or chain passing around all of said pulleys or gears, to drive the front wheel, substantially as described.

3. The combination with the crank-shaft of a bicycle-machine, the driving-gear thereon, of a supplemental gear or pulley adjacent to the driving-gear on the crank-shaft, an annular face-plate or rim secured to the spokes or webs of the ordinary driving-gear and bolts passing through said plate and supplemental pulley, securing the two gears together, substantially as described.

In testimony whereof I have signed my name to this specification in the presence of two subscribing witnesses.

CALEB LORING CUNNINGHAM.

Witnesses:
JOSEPH HOLMES,
MAURICE PIERCE.